(12) United States Patent
Scheidegger et al.

(10) Patent No.: US 10,369,671 B2
(45) Date of Patent: Aug. 6, 2019

(54) CHAIN MAGAZINE FOR HOLDING TOOLS

(71) Applicant: Liechti Engineering AG, Langnau im Emmental (CH)

(72) Inventors: Andreas Scheidegger, Konolfingen (CH); Ernst Haueter, Bowil (CH)

(73) Assignee: GF Machining Solutions AG (CH)

( * ) Notice: Subject to any disclaimer, the term of this patent is extended or adjusted under 35 U.S.C. 154(b) by 419 days.

(21) Appl. No.: 15/200,524

(22) Filed: Jul. 1, 2016

(65) Prior Publication Data
US 2017/0028522 A1  Feb. 2, 2017

(30) Foreign Application Priority Data
Jul. 27, 2015 (EP) ..................................... 15178448

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15724* (2016.11); *B23Q 3/15766* (2013.01); *B23Q 2003/15531* (2016.11); *Y10T 483/1836* (2015.01); *Y10T 483/1891* (2015.01)

(58) Field of Classification Search
CPC ......... Y10T 483/1891; Y10T 483/1836; Y10T 483/1818; Y10T 483/1827; Y10T 483/10; Y10T 483/1755; B23Q 3/15724; B23Q 3/15526; B23Q 3/15503; B23Q 3/15713; B23Q 2003/15531; B23Q 2003/15528; B23Q 2003/1553; B23Q 2003/155428; B65G 1/12; B65G 1/127; B65G 1/133
See application file for complete search history.

(56) References Cited

U.S. PATENT DOCUMENTS

| | | | | | |
|---|---|---|---|---|---|
| 3,760,491 A | * | 9/1973 | Zankl | ................... | B23Q 3/1554 414/730 |
| 3,817,391 A | * | 6/1974 | Lohneis | ............. | B23Q 3/15526 211/1.56 |
| 3,932,924 A | * | 1/1976 | Anderson | .......... | B23Q 3/15766 29/426.3 |
| 3,953,918 A | * | 5/1976 | Bone | .................... | B23B 31/265 483/41 |

(Continued)

FOREIGN PATENT DOCUMENTS

| | | |
|---|---|---|
| EP | 0636056 A1 | 2/1995 |
| EP | 2308637 A2 | 4/2011 |

(Continued)

OTHER PUBLICATIONS

Extended European Search Report (in German) dated Jan. 21, 2016 regarding Application No. 15178448.5 (6 pages).

*Primary Examiner* — Sunil K Singh
*Assistant Examiner* — Yasir A Diab
(74) *Attorney, Agent, or Firm* — Harness, Dickey & Pierce, P.L.C.

(57) ABSTRACT

The chain magazine for holding tool'(5) for machine tool'includes a continuous chain (1) which has chain links (2) each with at least one tool holder (2a, 2b) and with which at least one sprocket (6, 7) meshes and a guide device (9-12) which has a guide element (12) that can be moved back and forth between a first and a second position, by means of which a tool holder (2a, 2b) of a chain link (2) can be turned in and turned out.

11 Claims, 2 Drawing Sheets

(56) References Cited

U.S. PATENT DOCUMENTS

Figure 1:
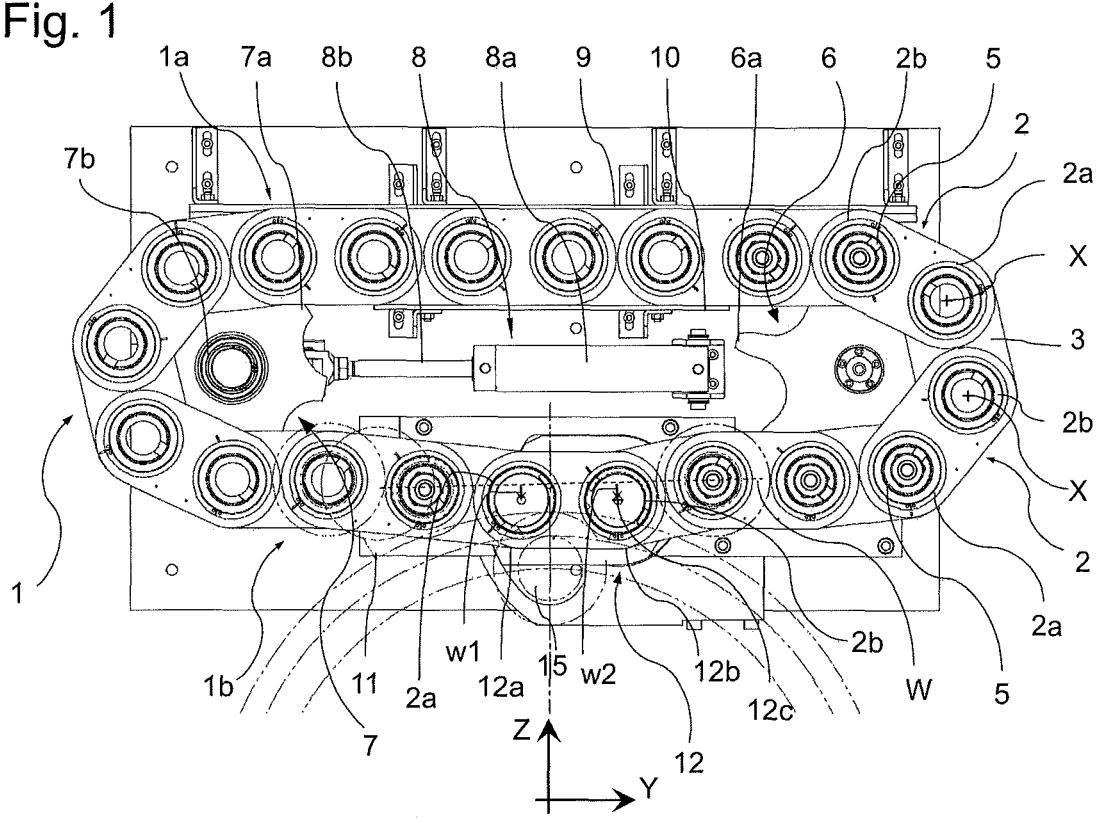

| | | | | |
|---|---|---|---|---|
| 4,182,021 | A | * | 1/1980 | Kato ................. B23Q 3/15526 211/1.56 |
| 4,773,152 | A | * | 9/1988 | Kitamura ............ B23Q 3/1574 483/43 |
| 4,993,996 | A | * | 2/1991 | Horny ............... B23Q 3/15526 474/155 |
| 5,554,087 | A | | 9/1996 | Hwang et al. |
| 6,024,681 | A | * | 2/2000 | Latten .................... B21D 5/02 483/29 |
| 6,042,524 | A | * | 3/2000 | Kato ................. B23Q 3/15526 483/13 |
| 7,575,543 | B1 | | 8/2009 | Sun et al. |
| 2008/0146426 | A1 | * | 6/2008 | Ishikawa ........... B23Q 3/15526 483/7 |
| 2011/0177925 | A1 | * | 7/2011 | Mayr ................. B23Q 1/4876 483/44 |

FOREIGN PATENT DOCUMENTS

| | | | | |
|---|---|---|---|---|
| GB | 1251064 A | | 10/1971 | |
| GB | 1349177 A | * | 3/1974 | ......... B23Q 3/15713 |
| GB | 2078567 A | | 1/1982 | |
| JP | 2002126961 A | * | 5/2002 | |
| JP | 2003-019635 A | | 1/2003 | |
| JP | 2010-137322 A | | 6/2010 | |

* cited by examiner

CHAIN MAGAZINE FOR HOLDING TOOLS

CROSS-REFERENCE TO RELATED APPLICATIONS

This application claims the benefit and priority of European Patent Application No. 15 178 448.5, filed Jul. 27, 2015. The entire disclosure of the above application is incorporated herein by reference.

FIELD

The invention relates to a chain magazine for holding tools according to the preamble of claim 1.

BACKGROUND

Chain magazines of this kind are used to supply a plurality of tools which are required for the different machining functions of machine tools. A tool change on the machine tool takes place by means of a double gripper, for example, on both arm ends whereof a tool can be held. If the double gripper is rotated, in order to remove a tool from the chain magazine or to introduce it into said magazine, a collision can occur with adjacent tools. This can be prevented by providing sufficiently large intervals between the tool holders, so that there is enough space for access; see application EP 2 308 637 A2, for example. However, the disadvantage of this kind of design is that the chain magazine has a relatively bulky configuration.

It is known from EP 0 636 056 A1 for each of the tool holders to be formed by two radially open sleeves. In this way, a tool can be removed or introduced by displacement in the plane in which the chain runs. However, special measures must be provided which prevent a tool from falling out when it is stored in the tool holder. This makes the design of the chain magazine relatively complicated.

SUMMARY

Based on this state of the art, the problem addressed by the invention is that of proposing a chain magazine which has a more compact design.

The chain magazine may be of compact design thanks to the provision of a guide device which has a guide element that can be moved back and forth between a first and a second position, by means of which a tool holder of a chain link can be turned in and turned out. In the turned-out position of a tool holder, space can be created to the side, in order to allow collision-free access by a gripper, for example. The guide device allows tools to be stored and retrieved quickly and easily.

The guide element preferably has two holding spaces for tool holders and is pivotable about a pivoting axis which coincides with an axis of articulation of a chain link arranged in the guide element. This configuration allows of a particularly simple chain magazine design.

DRAWINGS

Figure 2:
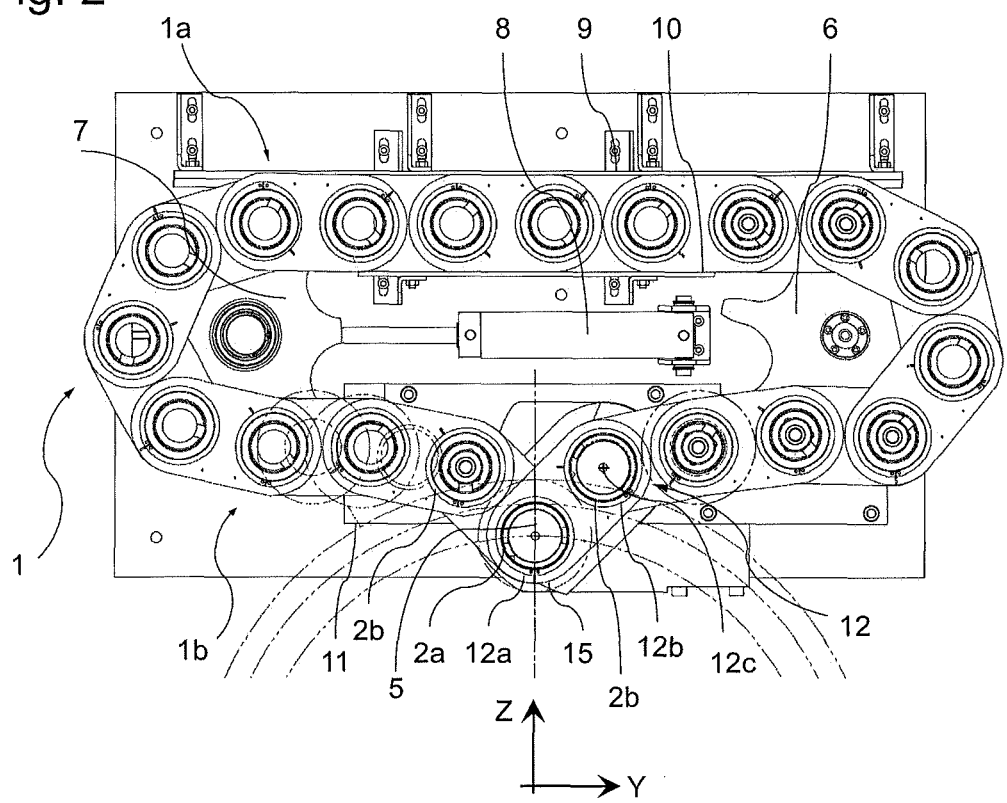
Figure 3:
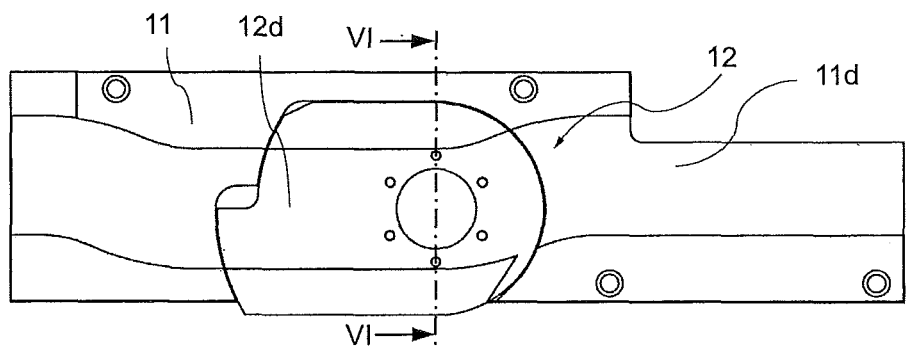
Figure 4:
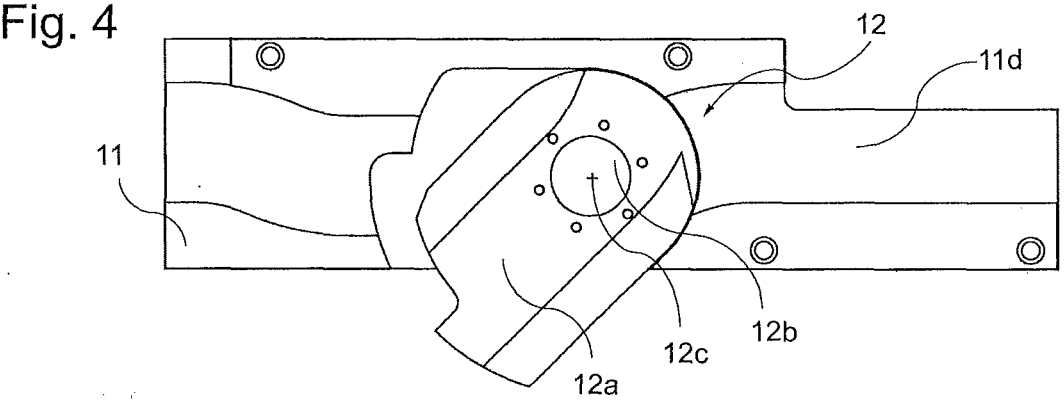
Figure 5:
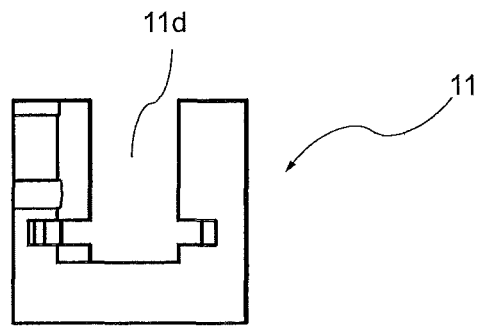
Figure 6:
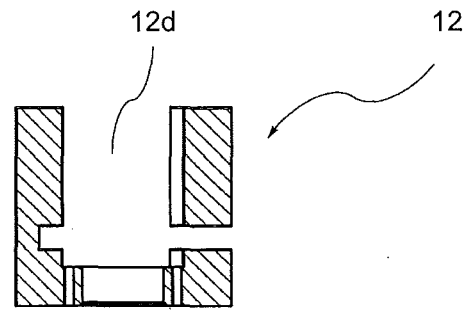

An exemplary embodiment of the invention is described below with reference to the attached drawings. In the drawings FIG. 1 shows a chain magazine in side view in the basic position, FIG. 2 shows the chain magazine from FIG. 1 with the chain link turned out, FIG. 3 shows a side view of the guide device for the chain magazine from FIG. 1 with a stationary and a pivotable guide element, FIG. 4 shows the view according to FIG. 3, wherein the pivotable guide element is located in the pivoted position, FIG. 5 shows a front view of the stationary guide element from FIG. 3 and FIG. 6 shows the pivotable guide element as a section along line VI-VI in FIG. 3.

DETAILED DESCRIPTION

FIG. 1 shows a chain magazine with a continuously rotating chain 1 which has chain links 2, 3 connected to one another in an articulated manner. A chain link 2 contains a first and second tool holder 2a, 2b which are each used to hold a tool 5 and are configured in the form of a quiver, for example. Each tool holder 2a, 2b is provided with an articulated joint to which a connecting link 3 is coupled which connects adjacent chain links 2 to one another. A chain link 2 is pivotable about an axis X in respect of a connecting link 3 coupled thereto, said axis running through the tool holder 2a or 2b and standing perpendicularly on the YZ-plane in which the chain 1 as a whole is movable. In the representation according to FIG. 1, the axis X stands perpendicularly on the sheet plane. A tool holder 2a, 2b is configured in a rotating manner, so that a tool can be removed or introduced by displacement in the X axis.

The chain 1 in the present exemplary embodiment runs about two sprockets 6, 7. It is conceivable for a sprocket to be provided only at the one reversal point, while the other reversal point is formed by a stationary guide element via which the chain 1 can slide away and which has a particularly smooth and resistant surface, for example. Furthermore, exemplary embodiments are also possible in which the chain 1 runs around three, four or more sprockets, in order to create a path with more than two reversal points.

Each sprocket 6, 7 has teeth 6a, 7b which mesh with the chain 1. At least one of the sprockets, sprocket 6 in this case, can be driven and to this end is connected to a chain drive (not shown). As explained below, a switchable reversal point is provided, so that the dimensions of the path of the chain 1 are variable. In order to compensate for changes of this kind, at least one of the sprockets is mounted both rotatably and also displaceably. In this way, independently of the switching state of the aforementioned reversal point, it can be guaranteed that the chain 1 remains sufficiently tensioned and the sprockets are always sufficiently meshed with the chain 1.

In the present exemplary embodiment, the axis 7b of the sprocket 7 about which said sprocket is rotatable is mounted in the Y-axis so as to be displaceable back and forth. This means that the interval between the sprockets 6 and 7 can be varied. A linear drive 8 which has a housing 8a mounted in a stationary manner and also a displaceable adjusting rod 8b which is coupled to the axis 7b of the sprocket 7 is used to displace the sprocket 7. A pneumatic drive can be used as the linear drive 8, for example.

A guide device 9-12 for the chain 1 is further depicted in FIG. 1. In this case, the guide device comprises guide elements 9, 10 which act on the upper strand 1a of the chain 1 according to FIG. 1, and also guide elements 11, 12 which act on the lower strand 1b of the chain 1 according to FIG. 1. The guide elements 9, 10 are configured in the form of rails between which the chain 1 runs through. The configuration shown in FIG. 1 is designed in such a way that the Z axis runs in the vertical and the weight therefore acts in this axis. The guide rail 10 in this case is designed in such a manner that in addition to the guide it is also suitable for supporting the chain 1 and the tools 5 held therein. Depending on use, the chain magazine may also be arranged with a different orientation. Accordingly, a respective guide element 9, 10 is differently configured, supplemented or, under certain circumstances, omitted entirely.

The guide element 11 is arranged in a stationary manner and designed to define the position of the chain strand 1b in relation to the guide element 12 which is configured pivotably and, for this purpose, is coupled to a drive (not shown). The pivoting axis 12c of the guide element 12 shows a chain link 2 in the direction of the X axis. The guide element 12 acts as a switchable reversal point, so that an arbitrary chain link 2 and therefore a tool holder 2a or 2b can be turned out, in order to make said tool holder more accessible for the handling of a tool 5.

The guide element 12 has a first holding space 12a on which a tool holder 2a or 2b is positionable and a second holding space 12b on which an adjacent tool holder 2b or 2a is positionable. The first holding space 12a can be turned out and in along with the tool holder 2a or 2b positioned there, while the second holding space 12b is pivotable along with the tool holder 2b or 2a positioned there about the pivoting axis 12c. In the depiction shown in FIG. 1, the two holding spaces 12a, 12b are occupied by tool holders 2a, 2b of the same chain link 2, so that the tool holder 2a can be turned out and in. If a tool holder 2b is to be turned out and in, the tool holders 2a, 2b in the two holding spaces 12a, 12b belong to two adjacent chain links 2.

The transfer station 15 at which a tool 5 can be removed from a tool holder 2a, 2b or introduced into said tool holder is located at the switchable reversing point.

The angle about which the guide element 12 is pivotable is adapted to the intended use of the chain magazine and may be at least 20°, preferably at least 30° and particularly preferably at least 40°.

In the exemplary embodiment according to FIG. 1, the lower chain strand 1b has an uneven course, so that even in the non-turned-out basic position of the guide element 12, there is an offset of the tool holders 2a, 2b held in the holding spaces 12a, 12b. In FIG. 1, the axis which runs through the centres of the tool holders adjacent thereto is indicated by the dotted line W. The tool holder 2a in the holding space 12a has an offset w1 relative to the axis W, the tool holder 2b in the holding space 12b has an offset w2. This uneven course of the chain strand 1b and therefore the offset of the tool holders 2a, 2b causes additional space to be created, even in the non-turned-out basic position, so that collision-free access can be facilitated.

A particularly large amount of space results in the position in which the guide element 12 is located in the pivoted position, as shown in FIG. 2. The tool holder, in this case 2a, holding the desired tool 5 is turned out and located at the transfer station 15. The interval between the two adjacent tool holders, in this case 2b, is shortened and this is compensated for by a displacement of the sprocket 7 in the Y direction. The turning-out of the tool holder causes said tool holder to be displaced transversely to the movement direction Y, in which the chain strand 1b is movable, as a result of which a particularly large amount of space is created to the side of the turned-out tool holder, in order to allow collision-free access by a gripper, for example.

FIGS. 3 and 4 show the guide elements 11, 12 without a chain 1. The guide element 11, 12 in each case has a guide channel 11d or 12d (cf. also FIGS. 5 and 6). During operation, the tool holders 2a, 2b of the chain 1 along with the tools 5 held therein are displaced through the guide channel 11d, 12d. As can be seen from FIG. 3, the guide channels 11d, 12d in the non-turned-out state of the guide element 12 form a continuous channel which has an offset intermediate portion and which therefore deviates from a straight course. This gives rise to the aforementioned offset w1 and w2 of the tool holders which are located at the holding space 12a or 12b. Depending on the intended use, it is also conceivable for this offset configuration to be omitted and for the guide channels 11d, 12d to be configured in such a manner that a channel with a straight course results.

An example of how the chain magazine operates is as follows: The chain 1 is moved until the tool holder 2a, 2b with the desired tool 5 is located at the first holding space 12a of the guide element 12. In the second holding space 12b, a tool holder 2a, 2b adjacent thereto is arranged so that its axis X coincides with the pivoting axis 12c. The tool holder 2a, 2b in the second holding space 12b is rotated during operation of the guide element 12 about the pivot axis 12c. At the same time, the tool holder 2a, 2b is turned out at the first holding space 12a and the tool 5 stored therein is made accessible for a handling device. In order to allow turning out, the sprocket 7 is displaced in the Y direction.

The handling device comprises a double gripper, for example, which has a rotatable lever, on both ends whereof a gripper is arranged for holding a tool. When used in the exemplary embodiment according to FIG. 2, the double gripper is rotatable about the X-axis and also movable in the X- and Z-axis. It is moved so far that the one gripper is able to grab the tool 5 in the transfer station 15. The tool 5 is removed from the chain magazine by displacing the gripper in the X-axis and therefore axially to the tool holder 12a, 12b. The double gripper is then turned, typically through 180°, so that the other gripper comes to rest with a tool to be stored at the transfer station 15. Through axial displacement, this tool is finally supplied to the tool holder 12a, 12b.

The chain magazine allows a compact design and can be used in a variety of applications, e.g. in machines for machining work, in order to exchange tools efficiently.

The person skilled in the art will be able to glean numerous modifications from the preceding description without departing from the scope of protection offered by the invention as defined by the claims.

In the example shown in the figures, the guide element 12 is of pivotable design. Other movement forms are also conceivable, in order to move the guide element back and forth between a first and a second position and thereby turn a tool holder out and in. For example, the guide element may be arranged in a linearly displaceable manner. To this end, in the embodiment according to FIG. 1, for example, a guide element is provided instead of the guide element 12 which is coupled to a drive and is linearly displaceable back and forth in the Z-axis, so that—similarly to the representation shown in FIG. 2—the tool holder 2a can be turned out and space created to the side for the storage and retrieval of a tool 5.

What is claimed is:

1. A chain magazine for holding took for a machine tools comprising:
   a continuous chain which has chain links forming a rotating chain having an inner side and an outer side, each chain link having a first tool holder and a second tool holder, a transfer station at which a tool from the first tool holder is gripped by a tool changer, the first tool holder having a first axis of rotation, the second tool holder having second axis of rotation, at least one sprocket which is configured to mesh with and drive the chain to carry a given chain link to the transfer station, a guide device for guiding the chain, and a guide element that can be moved back and forth between a first inward position and a second outward position to pivot the given chain link about the second axis of the second tool holder and turn out the given chain link to displace the first tool holder outwardly to the second outward position to facilitate gripping of a tool in the first tool holder by the tool changer.

2. A chain magazine according to claim 1 wherein the sprocket rotates about an axis, the sprocket being linearly movable to displace its axis.

3. A chain magazine according to claim 2, which has a linear drive to move the sprocket to displace the sprocket'rotational axis.

4. A chain magazine according to claim 1 wherein the guide element is arranged pivotably about a pivoting axis, wherein the pivoting axis wherein the pivoting axis coincides with the second axis of the second tool holder.

5. A chain magazine according to claim 1, wherein third and fourth tool holders are arranged adjacent to the first and second tool holders, the centers of the third and fourth tool holders lying on an axis W, wherein the first and second tool holders are displaced (w1, w2) relative to the axis W.

6. A chain magazine according to claim 1 wherein the tool holders are configured for the introduction or removal of a tool by the tool's displacement transversely to the plane (YZ) in which the chain runs.

7. A machine tool with a chain magazine according to claim 1.

8. A method for storing and changing took for a machine tool using the chain magazine of claim 1.

9. The method according to claim 8, wherein the tool changer includes a double gripper that is used to change the tools in the tool holders.

10. The method according to Claim 8, wherein a tool is removed from or introduced into at least one of the tool holders through the tool's displacement transversely to a plane (YZ) in which the chain runs.

11. A chain magazine for holding tools for a machine tool comprising:

a continuous chain which has chain links forming a rotating chain having an inner side and an outer side, each chain link having a first tool holder and a second tool holder, a transfer station at which a tool from the first tool holder is gripped by a tool changer, the first tool holder having a first axis of rotation, the second tool holder having second axis of rotation, at least one sprocket which is configured to mesh with and drive the chain to carry a given chain link to the transfer station, a guide device for guiding the chain, a guide element that can be moved back and forth between a first inward position and a second outward position to pivot the given chain link about the second axis of the second tool holder and turn out the given chain link to displace the first tool holder outwardly to the second outward position to facilitate gripping of a tool in the first tool holder by the tool changer; and a drive for linearly moving the sprocket when the given chain is turned outwardly to thereby maintain tension on the chain.

\* \* \* \* \*